Oct. 10, 1950      W. W. MEYER      2,525,366
SEAL
Filed April 20, 1946
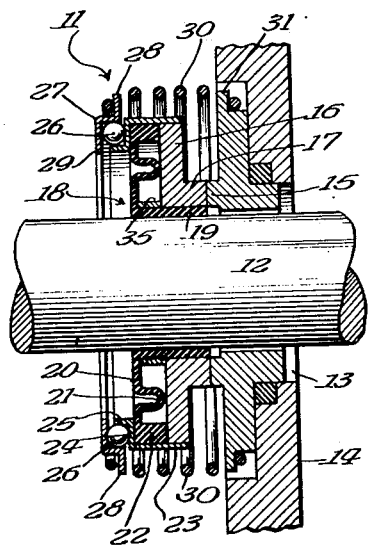
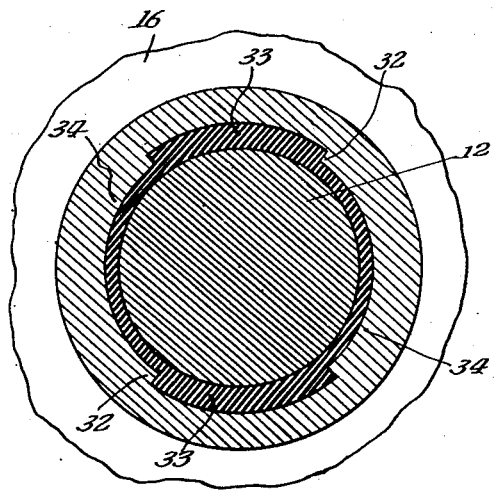
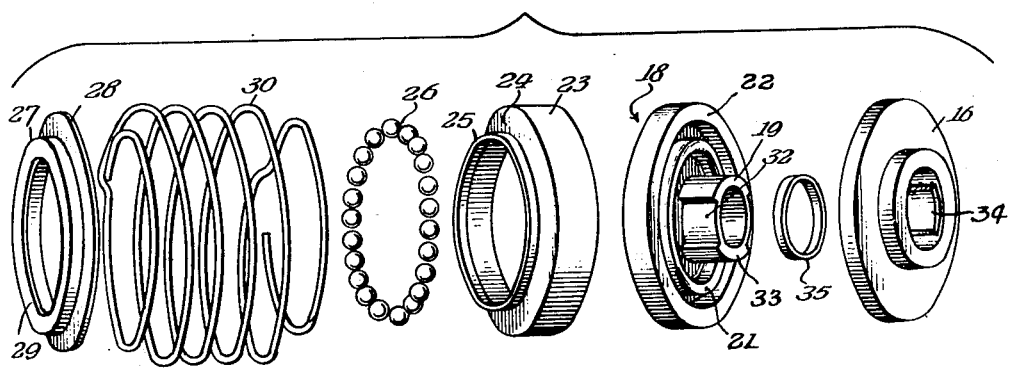
Inventor
Walter W. Meyer
By:— Spencer, Marzall, Johnston & Cook
Attys.

Patented Oct. 10, 1950

2,525,366

UNITED STATES PATENT OFFICE 2,525,366

SEAL

Walter W. Meyer, Arlington Heights, Ill., assignor to Rotary Seal Company, Chicago, Ill., a corporation of Illinois Application April 20, 1946, Serial No. 663,656

9 Claims. (Cl. 286—11)

The present invention relates in general to shaft seals, and has more particular reference to the provision of improved means for sealing rotating shafts to prevent fluid leakage along the shaft past the seal.

Seals of the character mentioned may include a seal ring adapted to be mounted in non-rigid fashion on the shaft to be sealed, and having an annular face formed for running engagement with a complementary annular surface or seat, within which, and with respect to which, the shaft is adapted to turn. The seal, also, may include a gasket sealingly fitted upon the shaft and to the seal ring; and the gasket is ordinarily frictionally fitted upon the shaft at a central opening therein, being thus sealed to and supported against relative turning movement with respect to the shaft. The gasket may have annular portions, outwardly of its shaft engaging portions, which annular portions are drivingly and sealingly secured to the ring. The ring is thus anchored against turning movement, with respect to the shaft, by the gasket. The gasket ordinarily comprises resilient rubber-like material in the interests of flexibility, but is necessarily of sufficiently thick section to drivingly connect the seal ring with the shaft and to support the ring in position to engage its cooperating seat. As a consequence, it has heretofore been necessary to sacrifice desirable gasket flexibility for the sake of adequate ring driving rigidity in the gasket portions between the ring and the shaft.

The seal ring ordinarily is urged into running engagement with its seat by spring means, usually a helical spring, encircling the shaft and bearing on a shaft abutment, to yieldingly thrust the seal ring upon its seat, appreciable spring thrust being required to maintain adequate sealing engagement where the sectional dimension of the gasket and, hence, its axial rigidity, is of the order required for ring driving purposes. As a consequence, it has heretofore been customary to utilize springs acting under compression, the over-all length of the seal assembly comprising the length of the spring plus the sum of the widths of the gasket and seal ring.

An important object of the present invention is to provide a seal of the character mentioned, having minimum over-all axial length; a further object being to employ a tension spring within which the seal ring and gasket are disposed, whereby the length of the unit is substantially equal to the sum of the widths of the ring and gasket.

A further object is to utilize a spring operating in tension to yieldingly hold the ring upon its cooperating seal; another object being to provide a seal structure wherein the spring is anchored on the seal seat and is turnable with respect to the shaft, or vice versa.

Still another object is to provide inexpensive thrust bearing means for connecting the spring on the seal ring.

Another object is to provide a seal assembly, including the cooperating seal seat, adapted for application as a replacement unit on a shaft to be sealed.

Another important object of the present invention is to provide a shaft seal of the character described, wherein an exceedingly flexible gasket element is employed, thereby minimizing ring seating thrust required to maintain the ring on its seat, so that seal wear is a minimum, and a light, inexpensive spring may be employed.

A further object is to utilize a sealing gasket of maximum flexibility, while providing for the adequate driving of the ring through the gasket, so that a spring of minimum power, operating in tension, may be used to hold the seal on its seat, thereby allowing the other objects and advantages, noted above, to be accomplished.

A further object is to provide a shaft seal, including a seal ring and a cooperating sealing gasket, wherein the gasket provides a diaphragm portion of maximum flexibility, and a ring driving portion which does not interfere with, or impair, the desirable flexibility of the diaphragm portion when the seal is in operation.

Another important object is to provide a shaft seal, including a seal ring and a flexible sealing diaphragm, wherein the ring has splined driving connection with a ring driving portion of the gasket and sealing engagement with a flexible diaphragm portion thereof.

A further object is to provide a shaft seal of the character mentioned, which imparts negligible thrust axially on the shaft with which used; a further object being to provide a seal comprising a minimum number of parts that may be manufactured at low cost, and which will afford improved sealing characteristics.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a sectional view through a shaft and seal embodying the present invention;

Fig. 2 is a sectional view taken substantially along the line 2—2 in Fig. 1; and Fig. 3 is an exploded view of parts of the seal shown in perspective.

To illustrate the invention, the drawings show a shaft seal assembly 11 for use on a shaft 12 for sealing the same against leakage along the shaft, as through an opening 13 in a member 14 through which the shaft extends. In the illustrated embodiment, the member 14 comprises a wall, in the opening 13 of which the shaft 12 is turnably mounted, although the member 14 may equally well comprise a portion of a structure turnably mounted on the shaft. In any event, the wall 14 is provided with an annular portion 15 surrounding the opening 13 to form a seal seat around the opening. The annular portion 15 may be formed as an integral portion of the member 14, or it may be formed as a separate collar or gland sealingly secured to the member 14 at the opening 13. The seal assembly 11 comprises a ring element 16, adapted to loosely encircle the shaft 12 and having an annular portion 17 on one side for running engagement with the seat 15, the engaging surfaces of the seat 15 and of the seat engaging portion 17 being accurately finished to provide highly polished surfaces adapted to form a running seal.

The seal ring and its cooperating seat 15 may comprise any suitable wearing or bearing materials, although it is preferable to form one of the portions 15 and 17 of material which is softer than the other, whereby the portion comprising the softer material may take the wear, while the cooperating portion remains substantially unworn. As a consequence, the element comprising the softer material may be made as a replacement unit, and, to this end, it is desirable to form the ring 16, and particularly the bearing portions 17 thereof, of relatively softer material than the material of the seat 15, it being ordinarily more expedient to supply the ring 16 as a replacement part, the seat 15 being usually a permanent part of the apparatus with which the seal is used. The seat 15, thus, may comprise steel, bronze, or other suitable seat forming material, while the bearing portions 17 may comprise Babbitt or other suitable bearing metal, carbon, graphite, graphitized metal, or any other suitable wearing material for bearing engagement with the material of the seat.

Associated with the ring element 16, the seal comprises a gasket element 18, preferably formed of resilient rubber-like material, such as Neoprene, or other resilient, flexible gasket material. The gasket 18 may have any suitable, usual or convenient form, the invention being not limited in all of its aspects to the particular form shown. As shown, however, the gasket preferably comprises a central cylindrical portion 19 adapted to snugly fit around, and engage upon, the surfaces of the shaft 12 on which it is mounted, the cylindrical portion being formed at one end with an integral outstanding flange 20 of relatively thin and flexible sectional thickness. If desired, the flange 20 may be formed with an annular pleat or pleats 21 arranged concentrically therein to increase the flexibility of the flange in the axial direction of the gasket. At its outer or marginal edge, the flange is formed with an annular rim 22 of preferably rectangular sectional configuration, said rim being appreciably thicker and more massive than the flexible flange portion 20 of the gasket.

The peripheral portions 22 of the gasket are preferably enclosed in a rim member 23, which may conveniently comprise an annular shell of relatively thin gauge sheet metal, said shell having a cylindrical wall portion adapted to enclose the marginal edge of the ring 16 and the rim 22 of the gasket, to maintain the same in registering alinement. The shell 23, also, preferably includes an inwardly extending flange portion 24 overlying the rim 22. The inner edge of the flange 24, also, is preferably offset to form an annular shoulder 25 providing, with the flange 24, one side of a bearing race for roller bearing elements 26. The elements 26 are retained in place by a retaining ring 27, which may comprise a metal stamping, providing a central cylindrical portion and outwardly and inwardly extending annular flanges 28 and 29 at opposite ends of said cylindrical portion. The inturned flange, with said cylindrical portion, forms the other side of the bearing race for the elements 26. A spring 30 of any suitable or preferred character bears on the flange 28. As shown, the spring 30 may comprise a helical element encircling the shaft and the seal elements 16 and 18, and connected and bearing at one end upon the flange 28, the spring, at its other end, being connected to the wall 14, as at an annular shoulder or lip 31 formed on the seat forming element 15. The spring 30, operating in tension, serves to hold the gasket rim 22 in sealing contact with the marginal edge of the ring element 16, and serves, also, to yieldingly hold the ring 16 upon the seal seat 15.

The cylindrical portion 19 of the gasket comprises a sleeve which encircles and frictionally engages the surface of the shaft on which it is mounted. This sleeve may be, and, in fact, preferably is of substantially greater sectional thickness than the thickness of the diaphragm flange 20, especially where an exceedingly thin flexible gasket is employed. The sleeve extends from the flange 20 along the shaft and within the shaft receiving opening of the ring 16, whereby the ring 16 encircles the sleeve 19. If a gasket of relatively thick diaphram section is used, it may be employed in fashion heretofore known to fasten the ring against rotation with respect to the shaft; but where a gasket of thin, flexible character is employed, the ring and sleeve are preferably formed with cooperating spline portions, as shown more particularly in Fig. 2 of the drawings, whereby the ring 16 is mounted against turning movement with respect to the sleeve 19, which, in turn, through its frictional connection on the shaft 12, is held against turning movement with respect to the shaft. The ring 16 is preferably snugly fitted on the spline portion of the sleeve 19, although it may move, as in creeping fashion, axially with respect to the sleeve.

Any preferred spline configuration may be employed to connect the ring 16 on the sleeve 19. As shown, the sleeve 19 is provided with a plurality of arcuate depressions 32 and intermediate projections or ribs 33 extending longitudinally in the outer surfaces of the sleeve, and the ring 16 is formed with corresponding inwardly extending projections 34 axially of its sleeve receiving opening, said projections 34 interfitting in the depressions 32 on opposite sides of the projections 33.

The ring 16 is, thus, drivingly connected with the sleeve portion 19 of the sealing gasket and, through said sleeve portion, the ring is drivingly connected with the shaft. The sleeve portion 19 of the gasket, also, forms a fluid-tight seal around the shaft. In order to assure tight sealing and driving engagement of the sleeve 19 with the shaft, a holding ring 35 may be applied around the sleeve 19 between the ring 16 and the flange portions 20 of the gasket, the groove portions 32 preferably not extending in the sleeve in the ring carrying end thereof. The marginal portions 22 of the gasket are firmly sealed to the marginal portions of the ring 16. The ring, in turn, under the influence of the spring 30, forms a tight running seal with the seal seat 15. As a consequence, the shaft is sealed against fluid leakage along the shaft past the seal and through the opening 13 in either direction.

Where the ring 16 comprises metal, the spline projections 34 thereof may be formed by a broaching operation during the fabrication of the ring as a machine finished element. Where the ring comprises carbon, graphite, or other moldable material, the spline projections 34 may be molded in the ring during the formation thereof in a suitable pressing die or mold. The gasket 18 of rubber-like material may, also, be produced inexpensively as a molded product in a suitable die. Such die may be configurated to form the sleeve 19 including the spline depressions and projections 32 and 33, the gasket flange 20, including pleats 21, if desired, as well as the sealing rim 22, all as an integral piece in finished form as delivered from the forming mold.

The foregoing construction utilizes a gasket of maximum flexibility in the diaphragm portions 20, whereby minimum spring pressure is required to maintain the seal in sealing engagement with the seat 15. The spring 30, consequently, may be of exceedingly light character, sufficient only to maintain adequate sealing engagement of the ring 16 with the seat 15, the spring 30 being not required to overcome any ring driving stiffness in the gasket. Axial thrust imparted on the shaft by the spring 30 is, thus, a negligible factor, which is of prime importance, especially where the seal is applied to tiny, light weight shafts.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A shaft seal comprising the combination, with a seal ring element adapted to encircle the shaft and having an annular seal surface for engaging and forming a running seal with a cooperating annular seal seat element with respect to which said shaft is relatively turnable, of gasket means for sealing the ring element to the shaft, said gasket having a sleeve portion sized to fit snugly upon the shaft and within the ring, spline means forming interengaging shoulders on the ring and sleeve portion for drivingly connecting the same, and tension spring means connected between said ring and seat elements for urging the ring element into sealing engagement with the seat element, including means to anchor the spring means on one of said elements, and bearing means for applying the thrust of the spring means on the other of said elements.

2. A shaft seal comprising the combination, with a seal ring element adapted to encircle the shaft and having an annular seal surface for engaging and forming a running seal with a cooperating annular seal seat element with respect to which said shaft is relatively turnable, of gasket means for sealing the ring element to the shaft, said gasket having a sleeve portion sized to fit snugly upon the shaft and within the ring, spline means forming interengaging shoulders on the ring and sleeve portion for drivingly connecting the same, and spring means connected between said ring and seat elements for urging the ring element into sealing engagement with the seat element, including means to anchor the spring means on one of said elements, and bearing means for applying the thrust of the spring means on the other of said elements, comprising cooperating race members, one on said other element and one on said spring means and roller members between said race elements.

3. A shaft seal comprising the combination, with a seal ring element adapted to encircle the shaft and having an annular seal surface for engaging and forming a running seal with a cooperating annular seal seat element with respect to which said shaft is relatively turnable, of gasket means for sealing the ring element to the shaft, said gasket having a sleeve portion sized to fit snugly upon the shaft and within the ring, spline means forming interengaging shoulders on the ring and sleeve portion for drivingly connecting the same, and spring means connected between said ring and seat elements for urging the ring element into sealing engagement with the seat element, including means to anchor the spring means on one of said elements, and bearing means for applying the thrust of the spring means on the other of said elements, said spring means encircling said ring element and gasket, whereby the axial dimension of the seal measured from the seal seat comprises no more than the sum of the thicknesses of the ring element, gasket and bearing means.

4. A shaft seal comprising the combination, with a seal ring adapted to encircle the shaft and having an annular seal surface for engaging and forming a running seal with a cooperating annular seal seat, with respect to which said shaft is relatively turnable, of gasket means for sealing the ring to the shaft, said gasket having a sleeve portion sized to fit snugly upon the shaft and within the ring, spline means forming interengaging shoulders on the ring and sleeve portion for drivingly connecting the same, and spring means for urging the ring into sealing engagement with its seat, including means to anchor the spring means on said seat, and bearing means for applying the thrust of the spring means on said ring.

5. A shaft seal comprising the combination, with a seal ring element adapted to encircle the shaft and having an annular seal surface for engaging and forming a running seal with a cooperating annular seal seat element, with respect to which said shaft is relatively turnable, of gasket means for sealing the ring element to the shaft, said gasket having a sleeve portion sized to fit snugly upon the shaft and within the ring, spline means forming interengaging shoulders on the ring and sleeve portion for drivingly connecting the same, and spring means for urging the ring element into sealing engagement with the seat element, including means to anchor the spring means on one of said elements, and bearing means for applying the thrust of the spring on the other of said elements, comprising cooperating race members, one on said other element and one on said spring means and roller members between said race members, said spring means encircling said ring element and gasket, whereby the axial dimension of the seal measured from the seal seat comprises no more than the sum of the thicknesses of the ring, gasket and bearing means.

6. A shaft seal comprising the combination, with a seal ring element adapted to encircle the shaft and having an annular seal surface for engaging and forming a running seal with a cooperating annular seal seat element, with respect to which said shaft is relatively turnable, of gasket means for sealing the ring element to the shaft, said gasket having a sleeve portion sized to fit snugly upon the shaft and within the ring, spline means forming interengaging shoulders on the ring and sleeve portion for drivingly connecting the same, and spring means for urging the ring element into sealing engagement with the seat element, including means to anchor the spring means on one of said elements, and bearing means for applying the thrust of the spring on the other of said elements, comprising cooperating race members, one on said other element and one on said spring means and roller members between said race members, said spring means comprising a helical spring encircling said ring element and gasket, whereby the over-all axial dimension of the seal measured from the seal seat comprises no more than the sum of the thicknesses of the ring, gasket and bearing means.

7. A shaft seal comprising the combination, with a seal ring element adapted to encircle the shaft and having an annular seal surface for engaging and forming a running seal with a cooperating annular seal seat element, with respect to which said shaft is relatively turnable, of gasket means for sealing the ring element to the shaft, said gasket comprising resilient material and having a shaft encircling sleeve portion sized to sealingly and drivingly engage the shaft, and a flange portion extending outwardly of said sleeve portion in position to sealingly engage said seal ring, spline means formed on the ring and sleeve ring, spline means formed on the ring and sleeve portion to directly connect said ring drivingly with said sleeve portion, and spring means connected between said ring and seat elements for urging the ring element into sealing engagement with the seat element, including means to anchor the spring means on one of said elements, and bearing means for applying the thrust of the spring means on the other of said elements.

8. A shaft seal comprising the combination, with a seal ring adapted to encircle the shaft and having an annular seal surface for engaging and forming a running seal with a cooperating annular seal seat, with respect to which said shaft is relatively turnable, of gasket means for sealing the ring to the shaft, said gasket comprising resilient material and having a shaft encircling sleeve portion sized to sealingly and drivingly engage the shaft, and a flange portion extending outwardly of said sleeve portion in position to sealingly engage said seal ring, spline means formed on the ring and sleeve portion to directly connect said ring drivingly with said sleeve portion, tension spring means for drawing the ring into sealing engagement with its seat, including means to anchor the spring means on said seat, and bearing means for applying the thrust of the spring means on said ring.

9. A shaft seal comprising the combination, with a seal ring adapted to encircle the shaft and having a shaft receiving opening therein and an annular seal surface for engaging and forming a running seal with a cooperating annular seal seat member, with respect to which said shaft is relatively turnable, of resilient gasket means for sealing the ring to the shaft, said gasket comprising resilient material and having a shaft encircling sleeve portion, sized to sealingly and drivingly engage the shaft, and a flexible flange portion on and extending outwardly of said sleeve portion in position to sealingly engage said seal ring at the peripheral edges of said flange, means to connect said ring drivingly with said sleeve portion, comprising interfitting means formed on said sleeve portion adjacent the flange portion and on said ring at the shaft receiving opening, tension spring means for urging the ring into sealing engagement with its seat, including means to anchor the spring means on said seat, and roller bearing means for applying the thrust of the spring means on said ring comprising cooperating race elements, one on said ring and one on said spring means, and roller members between said race elements, said spring means comprising a helical spring encircling said seal ring and gasket, whereby the over-all axial dimension of the seal measured from the seal seat comprises no more than the sum of the thicknesses of the ring, gasket and bearing means.

WALTER W. MEYER.

REFERENCES CITED

The following references are of record in the file of this patent:

UNITED STATES PATENTS

| Number | Name | Date |
|---|---|---|
| Re. 22,666 | Snyder | Aug. 14, 1945 |
| 1,700,731 | Baker | Feb. 5, 1929 |
| 1,797,735 | Spreen | Mar. 24, 1931 |
| 1,950,852 | Kuehn et al. | Mar. 13, 1934 |
| 2,131,544 | Weiland | Sept. 27, 1938 |
| 2,272,526 | Kuran | Feb. 10, 1942 |
| 2,277,196 | Arf | Mar. 24, 1942 |